United States Patent [19]
Kestermeier et al.

[11] 3,838,753
[45] Oct. 1, 1974

[54] DISC BRAKE CALIPER AND MOUNTING STRUCTURE

[75] Inventors: William J. Kestermeier; John R. Penn, both of South Bend, Ind.

[73] Assignee: The Bendix Corporation, South Bend, Ind.

[22] Filed: Dec. 21, 1970

[21] Appl. No.: 99,791

[52] U.S. Cl. ............................................. 188/73.3
[51] Int. Cl. ........................................... F16d 65/02
[58] Field of Search ........................ 188/72.4, 73.3

[56] References Cited
UNITED STATES PATENTS

| | | | |
|---|---|---|---|
| 3,368,647 | 2/1968 | Laverdant | 188/73.3 |
| 3,375,906 | 4/1968 | Hayes | 188/73.3 |
| 3,422,935 | 1/1969 | Van House | 188/73.3 |
| 3,648,807 | 3/1972 | Lottridge et al. | 188/73.3 |

FOREIGN PATENTS OR APPLICATIONS

| | | | |
|---|---|---|---|
| 253,373 | 4/1967 | Australia | 188/72.4 |
| 1,065,267 | 4/1967 | Great Britain | 188/73.3 |
| 86,481 | 1/1966 | France | 188/73.3 |
| 1,358,613 | 3/1964 | France | 188/73.3 |

*Primary Examiner*—George E. A. Halvosa
*Attorney, Agent, or Firm*—Ken C. Decker; William N. Antonis

[57] ABSTRACT

A disc brake is disclosed which includes a rotor having a pair of friction faces, friction elements opposed adjacent each of said friction faces, and caliper for urging the friction elements into frictional engagement with the corresponding friction faces when a brake application is effected. The caliper is mounted on a torque member which is mounted on a non-rotatable part of the vehicle. The torque member includes a pair of circumferentially spaced arms. Each of the arms is generally T-shaped to present a first portion extending generally parallel to the plane of the rotor and a second portion at the end of the first portion extending generally parallel to the axis of rotation of the rotor. The second sections are provided with elongated, axially extending bearing surfaces that slidably support corresponding bearing surfaces provided on the caliper. The second sections of the arms not only slidably support the caliper for axial movement with respect to the rotor, but also resist twisting of the caliper with respect to the torque member when a brake application is effected.

4 Claims, 4 Drawing Figures

INVENTORS
WILLIAM J. KESTERMEIR
& JOHN R. PENN
BY
Ken C. Decker
ATTORNEY

INVENTORS
WILLIAM J. KESTERMEIR
BY & JOHN R. PENN

Ken C. Decker

ATTORNEY 3,838,753

DISC BRAKE CALIPER AND MOUNTING STRUCTURE

BACKGROUND OF THE INVENTION

This invention relates to a floating caliper disc brake.

A common disc brake design provides a caliper which is slidably mounted on a fixed torque member by a pair of pin-like members. The caliper includes a fluid motor portion disposed on one side of a rotating disc, and a reaction portion disposed on the other side of the rotating disc. When a brake application is effected, the fluid motor portion urges a first friction element mounted on one side of the disc into engagement with the latter, and reaction forces acting through the reaction portion of the caliper urge the other section element into braking engagement with the other side of the disc. Such a disc brake is disclosed in U.S. Pat. No. 3,388,774, owned by the assignee of the present invention and incorporated herein by reference. Although disc brakes made pursuant to this design have provided quite satisfactory, the pin-like members which mount the caliper on the support have proven rather expensive to manufacture. Also, the twisting moments produced when a brake application is effected tend to twist disc brakes of this design in a plane generally perpendicular to the plane of the rotor. As will be readily appreciated by those skilled in the art, unless this twisting moment is resisted, the brake shoe linings will wear unevenly.

SUMMARY OF THE INVENTION

An important object of my invention is to provide a torque member that satisfactorily resists twisting of the caliper member when a brake application is effected.

Another important object of my invention is to provide a disc brake requiring fewer components than disc brakes known to the prior art.

Another important object of my invention is to eliminate the rather complicated pin-like members that were required to slidably support the caliper of disc brakes found in the prior art on their torque members.

Still another object of my invention is to facilitate the servicing of disc brakes, by enabling the caliper to be easily removed from the torque member.

DETAILED DESCRIPTION

Figure 1:
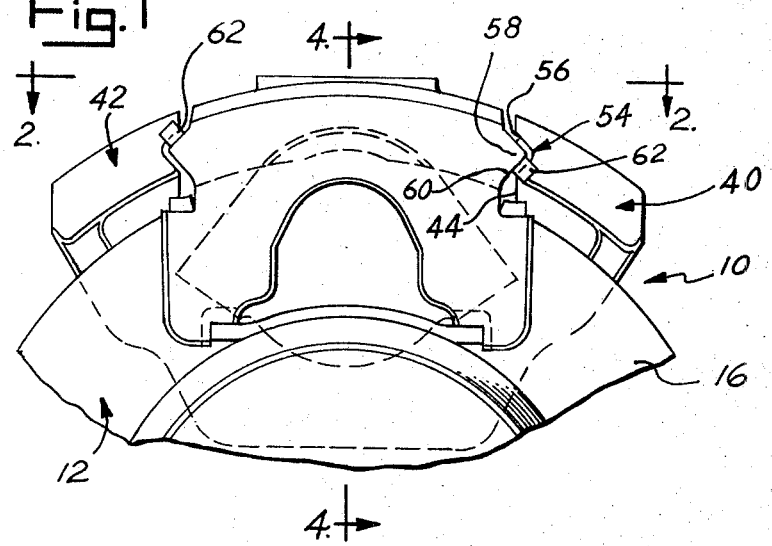
FIG. 1 is a side elevation of a disc brake made pursuant to the teachings of my present invention.
Figure 2:
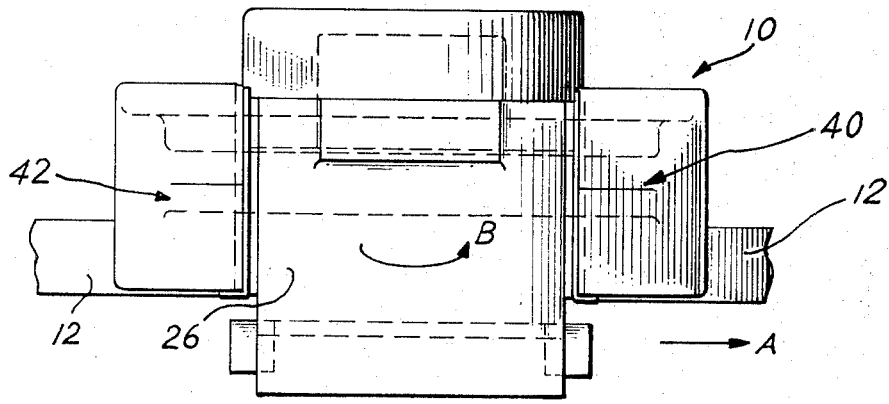
FIG. 2 is a top plan view of my disc brake taken substantially along lines 2—2 of FIG. 1.
Figure 3:
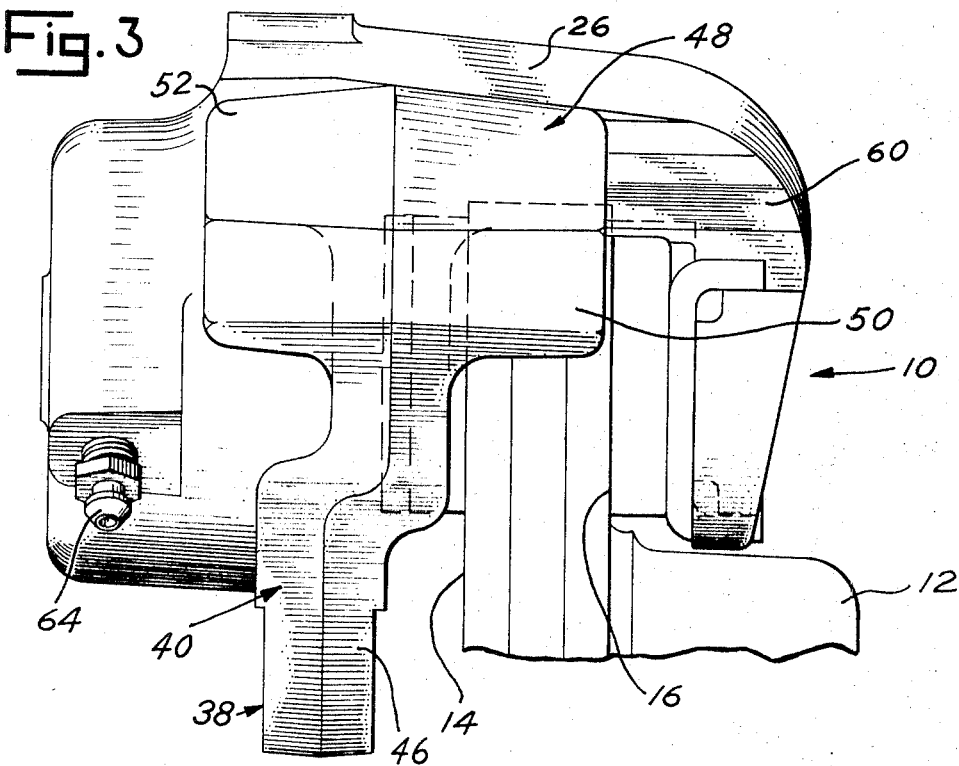
FIG. 3 is an enlarged end elevation of the disc brake illustrated in FIGS. 1 and 2.
Figure 4:
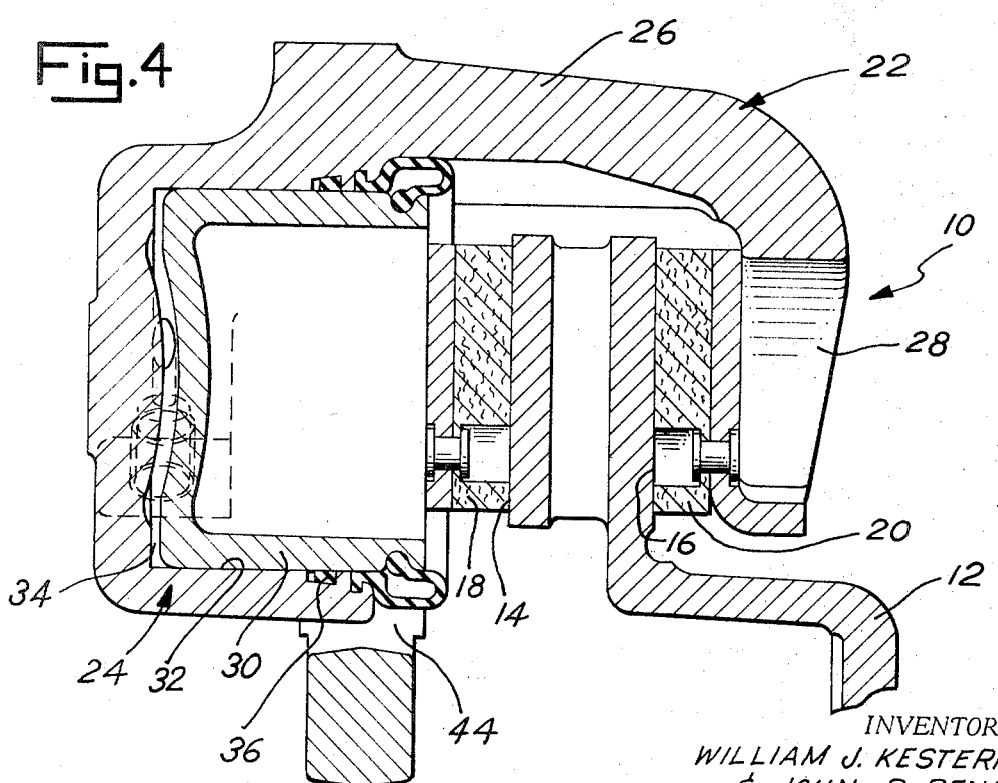
FIG. 4 is a cross section view taken substantially along line 4—4 of FIG. 1.

Referring now to the drawings, a disc brake indicated generally by the numeral 10 includes a rotor 12 having a pair of opposed friction faces 14 and 16. A pair of friction elements 18, 20 are disposed adjacent the friction faces 14 and 16, respectively. The friction elements 18 and 20 are urged into braking engagement with their corresponding friction faces 14, and 16 when a brake application is effected by a caliper generally indicated by the numeral 22. Caliper 22 includes a fluid rotor portion 24 disposed adjacent the friction face 14, a bridge portion 26 that traverses the periphery of the rotor 12, and a radially inwardly extending reaction portion 28 which is disposed adjacent the friction face 16. The fluid motor portion 24 includes a piston 30 slidably arranged in a bore 32 defined within the caliper 22. Fluid is admitted into the variable volume chamber 34 defined between the end of the piston and corresponding end of the bore 32 when a brake application is effected, to urge the piston 30 toward the rotor 12. When the brake is subsequently released, the piston 30 is returned to its brake release position by the seal 36 in a manner described in U.S. Pat. No. 3,377,076, owned by the assignee of the present invention and incorporated herein by reference.

The caliper 22 is slidably mounted for axial movement with respect to the rotor 12 by a torque member 38. The torque member 38 includes a pair of circumferentially spaced arms 40, 42 that define a recess 44 therebetween. The recess 44 receives the fluid motor portion 24 of the caliper 22, and also slidably supports the friction element 18 in such a manner that substantially all of the braking torque exerted by the latter is absorbed by the torque member 38. On the other hand, the friction element 20 is rigidly secured to the reaction portion 28 of the caliper 22 in such a manner that substantially all of the braking torque exerted by the element 20 is transmitted directly to the caliper 22.

Since the torque member 38 is symmetrical, the circumferentially spaced arms 40 and 42 are identical, and therefore only the arm 40 will be described in detail, it being understood that the arm 42 is identical to the arm 40. Arm 40 is generally T-shaped, presenting a first portion 46 extending generally parallel to the friction face 14 and a second portion 48 mounted disposed on the end of the section 46 and extending generally parallel with the axis of rotation of the rotor 12. The portion 48 includes a first section 50 that extends toward the rotor 12 from the portion 46, projecting over the portion of the periphery of the latter, and a second section 52 that extends from the portion 46 in the opposite direction, away from the rotor 12. A recess 54 extends through the portion 48 in an axial direction and side of the recess define axially extending bearing surfaces 56. The bridge portion 26 of the caliper 22 is provided with axially extending projections 58 that are received within the recesses 54 in the arms 40 and 42. The projections 58 are provided with axially extending bearing surfaces 60 that cooperate with the bearing surfaces 58 to slidably support the caliper 22 for axial movement with respect to the rotor 12. Releasable retaining means including keys 62 are disposed in the recesses 54 between the torque member 38 and the caliper 22. The removable keys 62 are more completely disclosed in co-pending U.S. Pat. application Ser. No. 878,475, now U.S. Pat. No. 3,616,879, filed Nov. 20, 1969, owned by the assignee of the present invention, and incorporated herein by reference. The keys 62 releasably retain the caliper member 22 on the torque member 38. It will be noted that the bearing surfaces 56 and 60, and therefore the keys 62, extend over the major portion of the axial length of the bridge portion 26 of the caliper member 22.

MODE OF OPERATION

When a brake application is effected, high pressure fluid is admitted into the variable volume chamber 34 through the fluid inlet 64 where it urges the piston 30 toward the friction face 14, thereby urging the friction element 18 into frictional engagement with the friction face 14. As is apparent to those skilled in the art, because the caliper 22 is slidably mounted on the torque member 38, reaction forces acting through the bridge portion 26 and the reaction portion 28 of the caliper 22 will also urge the friction element 20 into braking engagement with the friction face 16. As was described above, substantially all of the braking torque generated by the friction element 18 during a brake application is transmitted directly to the torque member 38. However, since the friction element 20 is rigidly secured to the reaction portion 28 of the caliper 22, substantially all of braking torque exerted by the friction element 20 is transmitted directly to the caliper 22. Assuming rotation of the rotor 12 in the direction of arrow A, engagement of the friction element 20 with the friction face 16 will create a twisting force on the caliper 22 acting in the direction of the arrow B. As is well known to those skilled in the art, prior art disc brakes in which a substantially planer torque member was used permitted the caliper 22 to twist relative to the torque member under the influence of the above-described twisting force. This permitted one edge of the friction element 20 to wear much more quickly than did the other edge. However, in the disc brake made pursuant to the teachings of our present invention, the twisting force B is restrained by forces acting through the elongated, axially extending portions 48 on the arms 40 and 42. Since the portions 48 engage the edges of the caliper 22 throughout a substantial portion of their entire axial length, twisting of the caliper 22 in a plane perpendicular to the rotor 12 is limited to an inconsequential amount. Of course, the axially extending portions 48 also slidably support the caliper 22, thereby permitting the rather complicated pin-like floatation devices used in prior art disc brakes to be eliminated.

To facilitate servicing of the brakes, such as when wear of the friction elements 18 and 20 necessitate their replacement, the caliper 22 may be removed from the torque member 38. This is accomplished by first removing the keys 62 from the recesses 54, and then lifting the caliper radially outwardly with respect to the rotor 12. The caliper 22 is installed on the torque member after servicing is completed by first inserting the projection 58 into the recesses 54, and then installing the keys 62 by forcing them between the caliper 22 and torque member 38 in a direction generally parallel to the axis of rotation of the rotor 12. Details on the method of removing and then reinstalling the caliper for servicing are more completely disclosed in the aforementioned U.S. Pat. application Ser. No. 878,475.

We claim:
1. In a disc brake:
a rotor having a pair of friction faces;
a pair of friction elements, one of said elements being disposed adjacent each of said friction faces;
a torque member having a pair of circumferentially spaced arms extending generally parallel to one of said friction faces and defining a recess therebetween slidably receiving one of said friction elements, said one element being movable toward and away from said one friction face;
each of said arms terminating in a component extending generally parallel to the axis of said rotor, each of said components including portions disposed radially outwardly of the periphery of said rotor and extending across at least half of the axial width of the latter, said components carrying bearing surfaces extending parallel to the axis of the rotor, said bearing surfaces extending over a substantial portion of the axial length of said components including the portions of the latter extending across at least half of the axial width of the rotor; and
a caliper member having a fluid motor portion disposed adjacent said one friction face, a bridge portion extending across the periphery of said rotor, and a radially inwardly extending portion extending generally parallel to the other friction face and carrying the other friction element whereby the braking torque generated by engagement of the other friction element with said other friction face is transmitted through said caliper member;
said caliper member having bearing surfaces extending parallel to the axis of the rotor carried by said fluid motor portion and bridge portion of the caliper member, said bearing surfaces on said caliper member being supported by the bearing surfaces on said components to thereby slidably support said caliper member for movement generally parallel to the axis of said rotor, the cooperation of those portions of said components and said caliper member extending over the periphery of the rotor being effective to resist twisting of the latter in a horizontal plane due to the braking torque exerted on the caliper member by engagement of said other friction element with said other friction face, the bearing surfaces on one of said members being defined by axially extending recesses integral with said one member, said recesses defining an upper bearing surface and a lower bearing surface in said one member, the bearing surfaces on said other member being defined by axially extending projections integral with said other member, said projections defining an upper bearing surface on one side of said projections and a lower bearing surface on the other side of said projections, the upper and lower bearing surfaces on said projections cooperating with the upper and lower projections on said recesses respectively whereby rotation of the caliper member with respect to the torque member in a vertical plane is prevented;
said caliper member being supported on said torque member solely by the bearing surfaces on the caliper member and the corresponding bearing surfaces on the torque member, the caliper member being otherwise free of support by said torque member.

2. The invention of claim 1; and
releasable retaining means operably connected with one of said projections and its corresponding recess to retain said caliper member upon said torque member, said caliper member being removable from said torque member upon release of the retaining means to permit one of said projections to be removed from its corresponding recess, whereupon the caliper member may be removed from the torque member radially outwardly with respect to said rotor.

3. The invention of claim 2:
said retaining means including resilient means yieldably urging said caliper member toward said torque member.

4. The invention of claim 3:

each of said arms having a generally T-shaped cross section whereby said components include portions disposed over the periphery of said rotor and other portions extending away from said rotor, said bearing surfaces being substantially coextensive with the length of said components.

* * * * *